(12) United States Patent
Schmidl et al.

(10) Patent No.: US 11,477,788 B2
(45) Date of Patent: *Oct. 18, 2022

(54) WIDEBAND BEACON CHANNEL FOR FREQUENCY HOPPING SYSTEMS

(71) Applicant: TEXAS INSTRUMENTS INCORPORATED, Dallas, TX (US)

(72) Inventors: Timothy Mark Schmidl, Dallas, TX (US); Ariton Xhafa, Plano, TX (US); Arvind Khandalu Raghu, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/075,332

(22) Filed: Oct. 20, 2020

(65) Prior Publication Data

US 2021/0037527 A1 Feb. 4, 2021

Related U.S. Application Data

(63) Continuation of application No. 16/116,259, filed on Aug. 29, 2018, now Pat. No. 10,813,094, which is a
(Continued)

(51) Int. Cl.
*H04W 72/04* (2009.01)
*H04L 5/00* (2006.01)
(Continued)

(52) U.S. Cl.
CPC ....... *H04W 72/0453* (2013.01); *H04L 5/0012* (2013.01); *H04L 5/0053* (2013.01);
(Continued)

(58) Field of Classification Search
CPC . H04W 72/0453; H04W 48/16; H04W 48/12; H04W 72/0433; H04W 24/08;
(Continued)

(56) References Cited

U.S. PATENT DOCUMENTS 7,046,644 B1  5/2006 Lappetelainen
7,505,426 B2  3/2009 Srikrishna et al.
(Continued)

FOREIGN PATENT DOCUMENTS

CN  101978761 A  2/2011
JP  2012505606    3/2012
(Continued)

OTHER PUBLICATIONS

Japanese Office Action for JP 2018-544085 dated Oct. 30, 2020.
(Continued)

*Primary Examiner* — Mohamed A Kamara
(74) *Attorney, Agent, or Firm* — Valerie M. Davis; Charles A. Brill; Frank D. Cimino

(57) ABSTRACT

A method of operating a network on a plurality of frequency hopping channels is disclosed. The method includes transmitting a beacon on a beacon channel different from the frequency hopping channels and receiving a request from a node to join the network in response to the beacon. The method further includes adding the node to the network in response to the step of receiving and communicating with the node on the plurality of frequency hopping channels after the step of adding.

20 Claims, 4 Drawing Sheets

Related U.S. Application Data continuation of application No. 15/048,843, filed on Feb. 19, 2016, now Pat. No. 10,091,786.

(51) Int. Cl.
  *H04W 84/18* (2009.01)
  *H04W 48/12* (2009.01)
  *H04W 48/16* (2009.01)
  *H04W 24/08* (2009.01)

(52) U.S. Cl.
  CPC ........... *H04W 24/08* (2013.01); *H04W 48/12* (2013.01); *H04W 48/16* (2013.01); *H04W 72/0406* (2013.01); *H04W 72/0433* (2013.01); *H04W 84/18* (2013.01)

(58) Field of Classification Search
  CPC ......................... H04W 72/0406; H04W 84/18; H04L 5/0053; H04L 5/0012
  See application file for complete search history.

(56) References Cited

U.S. PATENT DOCUMENTS

| | | | |
|---|---|---|---|
| 7,995,527 | B2 | 8/2011 | Li et al. |
| 8,054,864 | B2 | 11/2011 | Keshavarzian et al. |
| 8,897,277 | B2 | 11/2014 | Kalhan |
| 9,107,148 | B1 | 8/2015 | Malreddy et al. |
| 10,091,786 | B2 | 10/2018 | Schmildl et al. |
| 10,149,209 | B2 * | 12/2018 | Lepp ..................... H04W 72/12 |
| 2004/0239497 | A1 | 12/2004 | Schwartsman et al. |
| 2005/0177639 | A1 | 8/2005 | Reunamaki et al. |
| 2006/0264168 | A1 | 11/2006 | Corbett et al. |
| 2007/0247365 | A1 | 10/2007 | Laroia et al. |
| 2008/0224869 | A1 | 9/2008 | Kaplan |
| 2010/0040042 | A1 | 2/2010 | van Greunen et al. |
| 2010/0091700 | A1 | 4/2010 | Michaels |
| 2010/0296493 | A1 | 11/2010 | Lee et al. |
| 2011/0310770 | A1 | 12/2011 | Liang et al. |
| 2013/0243038 | A1 | 9/2013 | Rasband et al. |
| 2014/0119408 | A1 * | 5/2014 | Huettinger ........... H04B 1/7156 375/133 |
| 2015/0280777 | A1 * | 10/2015 | Azizi .................... H04W 88/06 370/330 |
| 2016/0150501 | A1 | 5/2016 | Hui et al. |

FOREIGN PATENT DOCUMENTS

| | | |
|---|---|---|
| JP | 2012239190 | 12/2012 |
| WO | 0117136 A1 | 3/2001 |
| WO | 200205448 A1 | 1/2002 |
| WO | 2014151059 | 9/2014 |

OTHER PUBLICATIONS

European Search Report for EU 20187107.6-1215 dated Nov. 11, 2020.
Bhatti, et al.; "Distributed Beacon Enabled Wireless Networks"; IEEE P802.15 Working Group for Wireless Personal Area Networks (WPANs); dated Jul. 7, 2008; pp. 1-19.
Bhatti, et al., "Extending the MAC Superframe of 802.15.4 Spec," IEEE 802.15-08-0420-02-004e, Project: IEEEE P802.15 Working Group for Wireless Personal Area Networks (WPANs), XP-002561703, Aug. 20, 2008, 19 pages.
Grotmol, O., "ANO24 Frequency Hopping Protocol for CC1010," Chipcon AS, Application Note AN024, Rev 1.0, Jul. 30, 2003, 11 pages.
Lee, A., et al., "Distributed Channel Hopping MAC for Industrial Applications," IEEE 15-08-0816-00-004e, Project: IEEEE P802.15 Working Group for Wireless Personal Area Networks (WPANs), Nov. 2008, 23 pages.
Vogli, E., et al., "Fast Join and Synchronization Schema in the IEEE 802.15.4e MAC," 2015 IEEE Wireless Communications and Networking Conference (WCNC)—Workshop—Energy Efficiency in the internet of Things and Internet of Things for Energy Efficiency, pp. 85-90.
"Field Area Network Working Group (FANWG) Field Area Network Technical Profile Specification," Wi-Sun Alliance, Version 0v79, 20130125-FANWG-FANTPS-0v79, 128 pages.
International Search Report and Written Opinion dated May 18, 2017, PCT Application No. PCT/US2017/018591, 8 pages.
Extended European Search Report dated Jul. 5, 2019, European Application No. 17754018.4, 10 pages.

* cited by examiner

| TIME | 0 | 1 | 2 | 3 | 4 | 5 | 6 |
|---|---|---|---|---|---|---|---|
| GUESSED MASTER | 0 | 1 | 2 | 3 | 4 | 5 | 6 |
| SLAVE | 0 | 2 | 1 | 5 | 2 | 8 | 3 |
FIG. 3
(PRIOR ART)
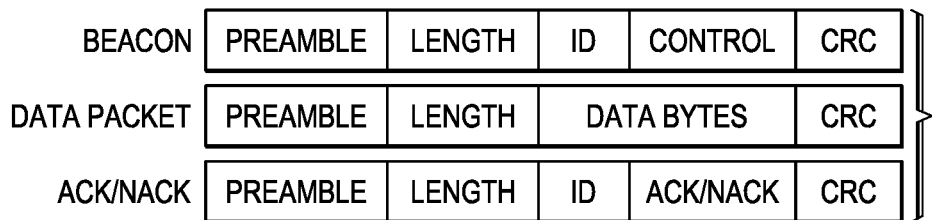
FIG. 4
(PRIOR ART)
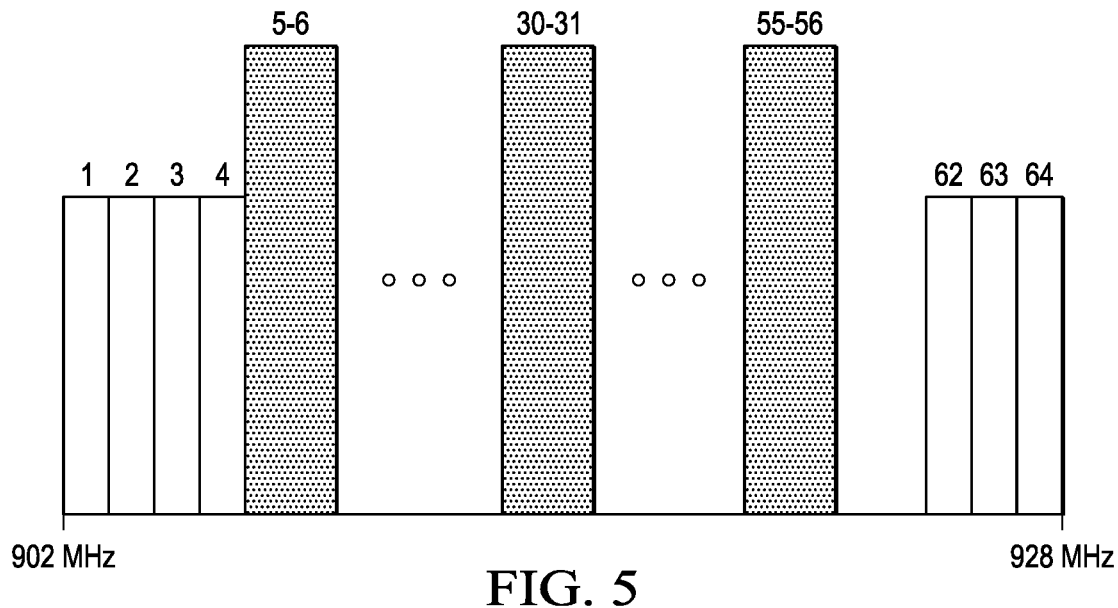
FIG. 5

WIDEBAND BEACON CHANNEL FOR FREQUENCY HOPPING SYSTEMS

CROSS-REFERENCE TO RELATED APPLICATIONS

This application is a continuation of U.S. patent application Ser. No. 16/116,259, filed Aug. 29, 2018, which is a continuation of U.S. patent application Ser. No. 15/048,843, filed Feb. 19, 2016, now U.S. Pat. No. 10,091,786, each of which is incorporated herein by reference in its entirety.

BACKGROUND OF THE INVENTION

The present embodiments relate to wireless mesh communication system and, more particularly, to a network with wideband beacon channels for frequency hopping systems.

A wireless mesh network is a type of wireless communication system where at least one wireless transceiver must not only receive and process its own data, but it must also serve as a relay for other wireless transceivers in the network. This may be accomplished by a wireless routing protocol where a data frame is propagated within the network by hopping from transceiver to transceiver to transmit the data frame from a source node to a destination node. A wireless node may be a wireless access point such as a wireless router, a mobile phone, or a computer capable of accessing the internet. In other applications, the wireless node may be an external security monitor, a room monitor, a fire or smoke detector, a weather station, or any number of other network applications for home or business environments.

FIG. 1 shows an exemplary wireless network of the prior art as disclosed in version 0v79 of the 2013 Wi-SUN Alliance Field Area Network Working Group, which is incorporated by reference herein in its entirety. The network includes an internet access circuit 150. The network also includes Personal Area Network (PAN) circuits A through C. Each of PAN communicates with circuit 150 through respective Master nodes MA 100, MB 120, and MC 130.

PAN A is an exemplary network that may be similar to PANs B and C. PAN A communicates with circuit 150 through Master node MA 100. MA 100 communicates directly with relay node (RN) 102 and with leaf node (LN) 114. Thus, MA 100 is a parent node of RN 102 and LN 114. RN 102 is a parent of RN 104 and communicates indirectly with LN 106 via RN 104. RN 102 also communicates directly with RN 108 and indirectly with RN 110 via RN 108. RN 108 also communicates directly with LN 112. RN 108 is a parent of both RN 110 and LN 112. Frequency Hopping Protocol (FHP) is often used within the network to reduce interference and provide frequency diversity.

Frequency hopping is used for many narrowband communication systems in the United States because the FCC regulations (15.247) allow higher transmit power for narrowband frequency hopping systems in the bands 902-928 MHz, 2400-2483.5 MHz, and 5725-5850 MHz. For the 902-928 MHz band if at least 50 hopping channels are used with 20 dB bandwidth less than 250 kHz, then 1 watt of transmit power can be used. For a 20 dB bandwidth between 250 kHz and 500 kHz then at least 25 hopping channels are needed. If frequency hopping is not used for these narrowband systems then they would fall under regulation 15.249, where the transmit power would be limited to −1.25 dBm or 0.75 mW. This is over 1000 times lower transmit power than the frequency hopping system. For wider bandwidth systems using digital modulation techniques, 1 watt of transmit power can be used if the 6 dB bandwidth is at least 500 kHz.

IEEE 802.15.4g defines frequency hopping systems for smart utility networks (SUN) using one of three physical layers: frequency shift keying (FSK), orthogonal frequency division multiplexing (OFDM), or direct sequence spread spectrum (DSSS). DSSS may also be referred to as offset quadrature phase shift keying (OQPSK). For the 902-928 MHz band there are 129 channels with a 200 kHz channel spacing or 64 channels with a 400 kHz channel spacing (FIG. 2). Both of these definitions meet the number of hopping channels required by 15.247, so 1 watt of transmit power can be used. One challenge with SUN frequency hopping systems is that the join procedure for a new node may take a long time.

When the network uses a star configuration where there is a central hub, then the central hub can transmit a beacon that other nodes can use to learn the hopping sequence so that they can join the network. However, often a mesh network is used where there is no central hub. In a mesh network each node can transmit to a neighboring node until the message reaches a data concentrator or network master which would be connected to a backbone to transmit data to the utility. For the reverse direction messages can hop from node to node to reach a leaf node. For a new node to join a mesh network it would need to either camp on one channel and wait until a neighboring node transmits a beacon message or it would need to be able to scan many channels sequentially to find a beacon.

This problem is illustrated with reference to FIG. 3. When powered up the slave nodes must perform an acquisition to find out where in the sequence of frequencies the master resides. A new acquisition may also have to be performed if synchronization is lost, for example, due to noise or being temporarily moved out of radio range. In the latter case the slave has an idea of which frequency the master is transmitting on, and this information is exploited to achieve faster acquisition. When performing acquisition, the slave must always listen for one full period at each frequency that is being examined to be sure of picking up the beacon. It starts at the frequency that it believes to be most likely and then moves on to the most nearby frequencies in the pseudo-random sequence. This is typically a random selection when the slave is powered up. At time 0 (first row), if the first master frequency guess is 0 (second row), the closest frequencies are 0, 1, −1, 2, −2, 3, −3, and so forth. However, since the master is also stepping through the frequencies, this sequence must be shifted by the sequence 0, 1, 2, 3, 4, 5, 6, etc. The actual frequencies examined, therefore, are 0, 2, 1, 5, 2, 8, 3 (third row). If all frequencies are examined without result, the acquisition sequence must start over again. Assuming the failure is due to the slave being out of radio range, the application may choose to have a delay between each acquisition to reduce power consumption.

For networks of the prior art, when the slave is powered up and does not know where the master is hopping, it chooses a random frequency and listens. It can take a long time until it finds a beacon from the master. For example, if there are 50 hopping frequencies, then the slave may need to listen through 50 beacon cycles to find a beacon if there is no fading or interference. If beacons are missed due to fading or interference, it can take much longer to find a beacon. A typical beacon packet format of the prior art is illustrated at FIG. 4 together with a data packet and acknowledge/negative acknowledge (ACK/NACK) packets. Each packet includes a preamble, packet length, and cyclic redundancy check (CRC) field. The beacon and ACK/

NACK packets also include a source identification (ID) field. The beacon packet also includes control information which specifies the network frequency hopping protocol (FHP) and other network information to the slave.

Although network proposals of the prior art provide steady improvements in wireless network communications, the present inventors have recognized that still further improvements in mesh network protocol are possible. Accordingly, preferred embodiments described below are directed toward this and other improvements over the prior art.

BRIEF SUMMARY OF THE INVENTION

In a first embodiment of the present invention, there is disclosed a method of operating a network on a plurality of frequency hopping channels. The method includes transmitting a beacon on a beacon channel different from the frequency hopping channels and receiving a request from a node to join the network in response to the beacon. The method further includes adding the node to the network in response to the step of receiving and communicating with the node on the plurality of frequency hopping channels after the step of adding.

In a second embodiment of the present invention, there is disclosed a method of operating a network on a plurality of frequency hopping channels. The method includes receiving a beacon on a beacon channel different from the frequency hopping channels and transmitting a request to a parent node to join the network in response to the beacon. The method further includes receiving a grant to join in response to the step of transmitting and communicating with the parent node on the plurality of frequency hopping channels after the step of receiving the grant to join.

BRIEF DESCRIPTION OF THE SEVERAL VIEWS OF THE DRAWING

FIG. 3 is a diagram showing a problem that may arise during network acquisition in a wireless network operating under frequency hopping protocol (FHP);

FIG. 4 is an exemplary diagram showing packet formats for beacon, data, and acknowledge/negative acknowledge (ACK/NACK) packets;

FIG. 5 is a diagram showing network frequency hopping channels and dedicated beacon channels according to the present invention;

DETAILED DESCRIPTION OF THE INVENTION

Figure 1:
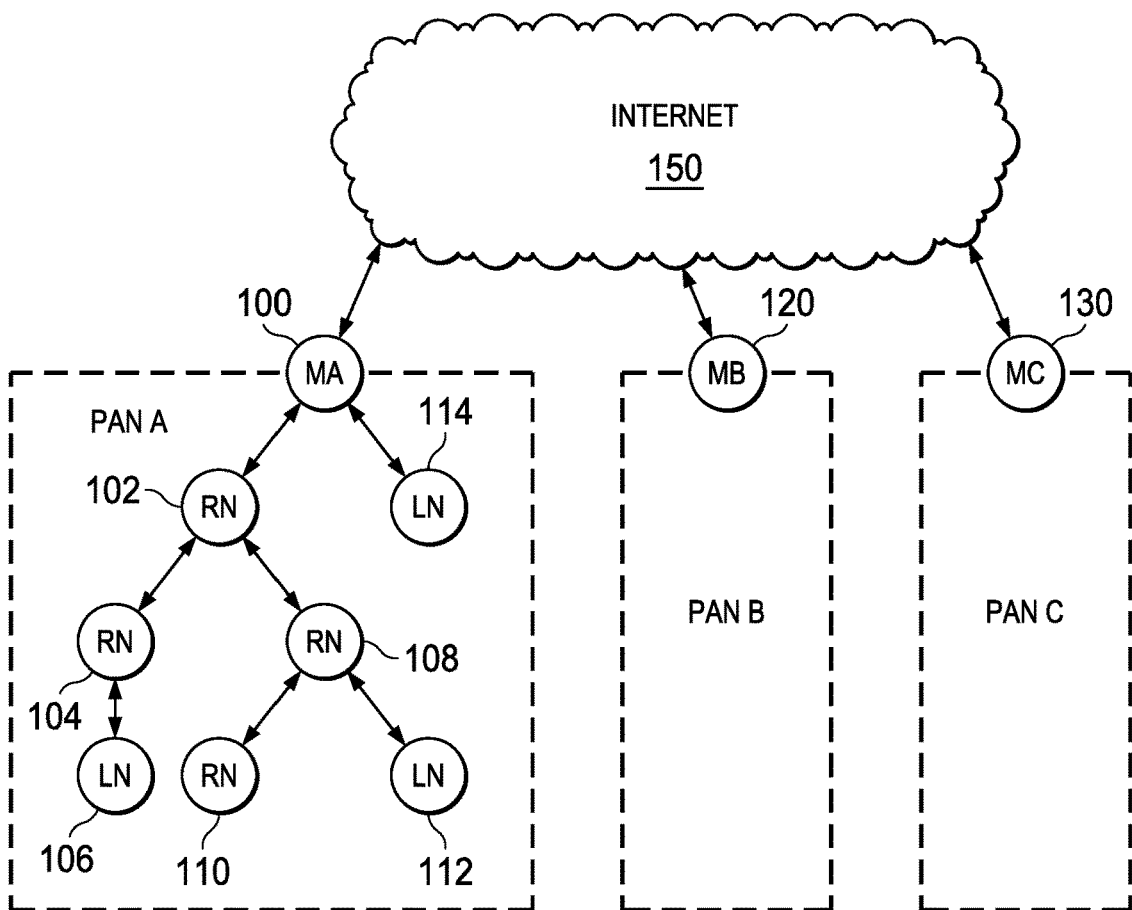
FIG. 1 is a diagram showing an exemplary wireless network of the prior art.
Figure 2:
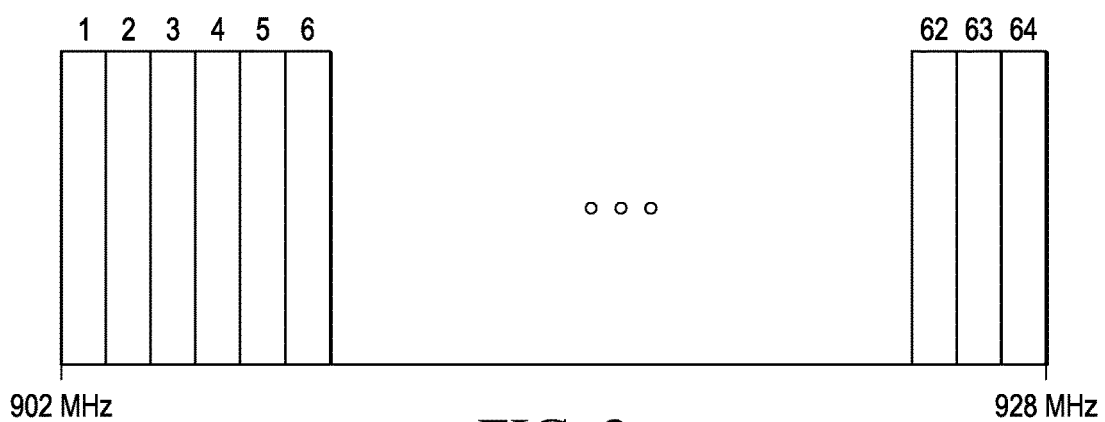
FIG. 2 is a diagram showing exemplary channel hopping channels for the wireless network of FIG. 1.

Referring now to FIG. 5, there is a diagram showing network frequency hopping channels and dedicated beacon channels according to the present invention. The diagram is the same as FIG. 2 except that channels 5-6, 30-31, and 55-56 are replaced by three dedicated beacon channels. The diagram of FIG. 5, therefore, has fifty-eight (58) 400 kHz frequency hopping channels and three (3) 800 kHz dedicated beacon channels. The three wideband channels are used for dedicated beacon channels during network acquisition, while the fifty-eight narrowband channels are used for frequency hopping during normal network communication. If the 6 dB bandwidth of a channel is greater than 500 kHz, then frequency hopping is not needed. The three beacon channels, therefore, are advantageously used to provide frequency diversity in case one or more of the beacon frequencies are in a fade. Since there are only three dedicated beacon channels in the 902-928 MHz frequency band, a node wishing to join the network need not listen to all 64 channels with the added complexity of frequency hopping.

In an alternative embodiment of the present invention, the 902-928 MHz band may be divided into one hundred twenty-nine (129) 200 kHz channels. Nine narrowband channels may be removed from the frequency hopping sequence and used for three (3) 600 kHz dedicated beacon channels. If a beacon channel occupies 600 kHz, this would remove 9 narrowband channels from the frequency hopping channel list leaving 120 channels with a bandwidth 200 kHz.

Figure 6:
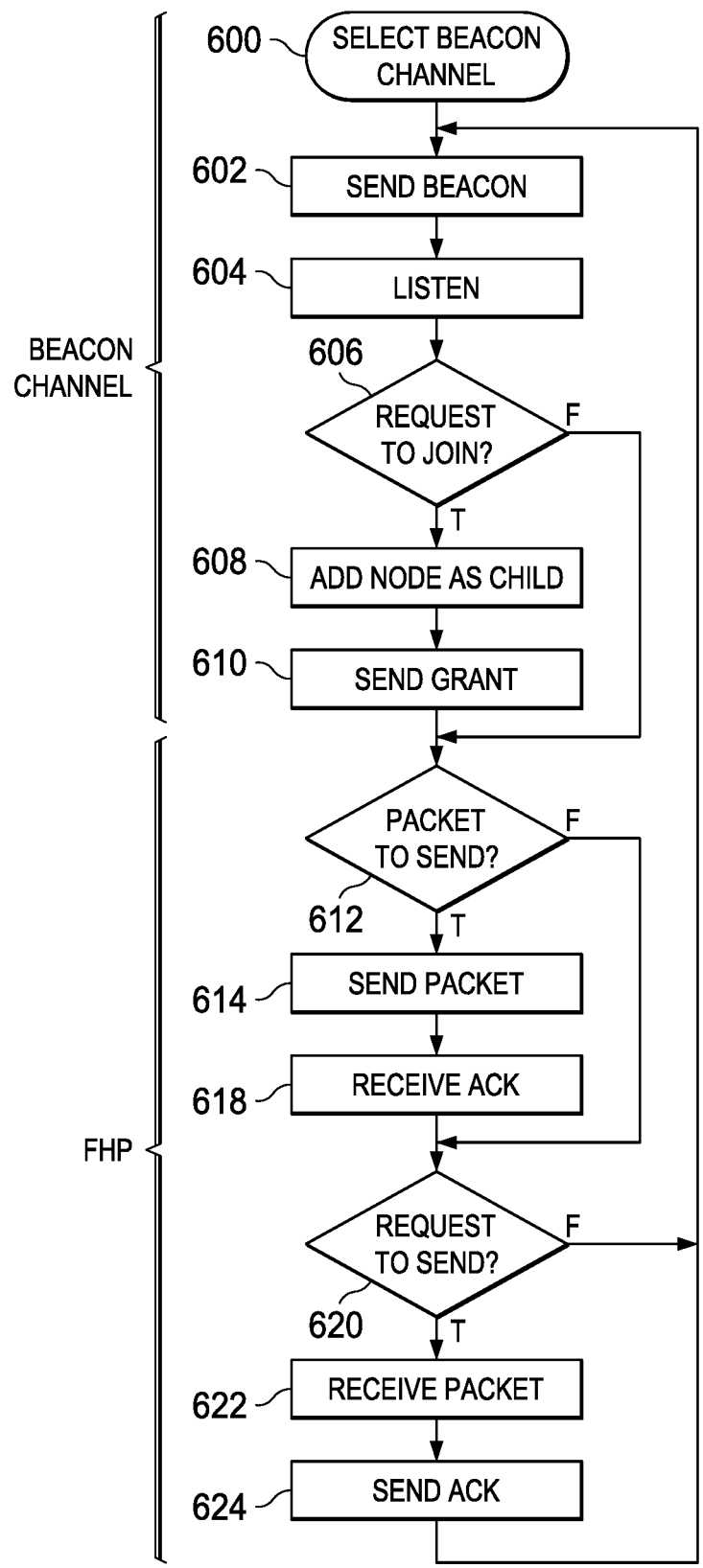
FIG. 6 is a flow diagram showing network master operation when receiving a request to join during network acquisition.

Referring next to FIG. 6, there is a flow diagram showing network master operation when receiving a node request to join during network acquisition. The network master selects a dedicated beacon channel at step 600 and transmits a beacon packet 602 periodically. The beacon packet may be similar to the beacon packet of FIG. 2 and includes control information to enable a node attempting to join the network to adapt to network frequency hopping protocol (FHP). The control information may also include other network operating information such as power modes, synchronization, time slot information, and other relevant control information to enable the node to join the network. The network master sends the beacon periodically followed by a listening period at step 604. If no request to join is received during the listening period 604, operation proceeds to test 612. If the network master does receive a request to join 606 during the listening period 604, it adds the requesting node as a child or slave 608 and becomes its network parent. At step 610 the network master sends the node a grant to join and proceeds to test 612. If the network master determines there is a packet to send 612, it sends the packet to the appropriate network recipient 614 and receives an ACK (or NACK) 618 as determined by the packet cyclic redundancy check (CRC). The network master further determines if one or more of the network nodes has transmitted a request to send at test 620. If so, the network master receives the packet 622 and sends an ACK (or NACK) 624 as determined by the CRC. The network master then returns to step 602 and transmits another beacon on the dedicated beacon channel. The network master steps through a pseudo-random sequence of frequencies known to network slaves at each step 602. Each beacon includes unique network information (ID), so network slaves do not respond to the wrong network master. An important aspect of the present invention is that a dedicated beacon channel is used for network acquisition in steps 600 through 610. Transmissions on the dedicated beacon channel have a greater bandwidth than normal frequency hopping channels, and corresponding beacons are transmitted with about the same transmit power as the normal frequency hopping channels. This advantageously improves reception and reduces acquisition time during network acquisition. An alternative embodiment is to have two distinct systems where one uses wideband channels such as in wireless LAN systems, and the joining of the network is done through that system. The frequency hopping system is a distinct system such as Bluetooth, and the frequency hopping information is passed from the wideband system to make it easier to join the frequency hopping system.

Figure 7:
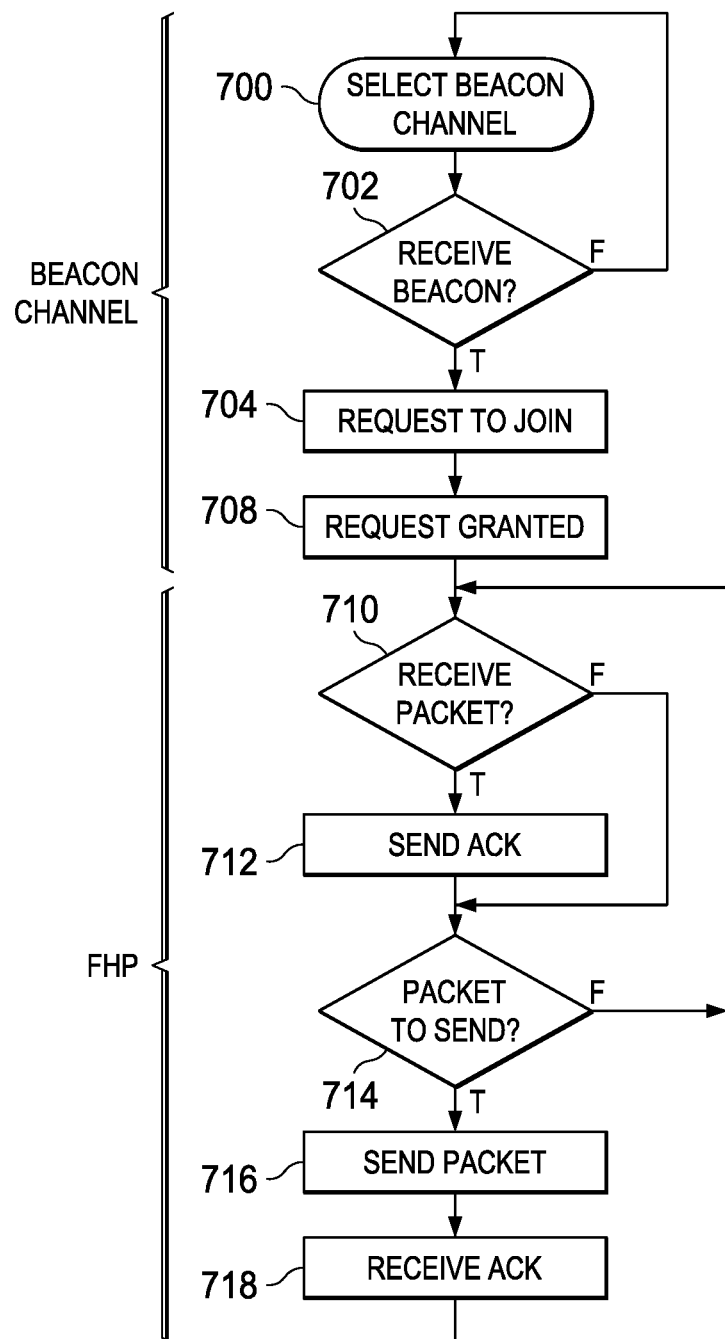
FIG. 7 is a flow diagram showing slave operation when requesting to join a network.

Turning now to FIG. 7, there is a flow diagram showing node operation when requesting to join a network. A node attempting to join a network selects a beacon channel 700 to monitor. If the signal-to-noise ratio (SNR) of the selected beacon is unsuitable, the node may select a different beacon channel to monitor. If no beacon is received, the node continues to monitor the selected beacon channel. If a beacon is received on the dedicated beacon channel 702, the node transmits a request to join 704. The request to join is granted at step 708. The node then enters the network and operates according to network frequency hopping protocol (FHP) as specified by the beacon control information (FIG. 4). When the node enters the network it becomes a slave to the network master and determines if there is a packet to receive 710. If so, the slave receives the packet and sends an ACK (or NACK) 712 as determined by the CRC. The slave then proceeds to step 714 and determines if it has a packet to send. If so, the slave initiates a request to send and sends the packet 716 at the proper time. At step 718, the slave receives an ACK (or NACK) as determined by the CRC and returns to step 710. The present invention advantageously provides several dedicated beacon channels that are not subject to frequency hopping to facilitate network acquisition. A node attempting to join the network may select a beacon channel with the best SNR. The beacon is transmitted at a higher transmit power to further improve the SNR without interfering with the normal frequency hopping channels.

Still further, while numerous examples have thus been provided, one skilled in the art should recognize that various modifications, substitutions, or alterations may be made to the described embodiments while still falling with the inventive scope as defined by the following claims. Other combinations will be readily apparent to one of ordinary skill in the art having access to the instant specification.

What is claimed is:

1. A network node of a network, the network node configured to:
    transmit a beacon packet on a wideband, non-frequency hopping beacon channel;
    add a node to the network; and
    communicate, with the node on a plurality of narrowband, frequency hopping channels, after adding the node to the network.

2. The network node of claim 1, wherein the beacon channel has a greater transmit power than each of the plurality of frequency hopping channels.

3. The network node of claim 1, wherein the beacon packet is transmitted on a separate network from the network of the plurality of frequency hopping channels.

4. The network node of claim 1, wherein the beacon packet comprises control information to control network operation.

5. The network node of claim 1, wherein the beacon packet comprises frequency hopping protocol (FHP) information.

6. The network node of claim 1, wherein the beacon packet comprises a periodic sequence of frequencies.

7. The network node of claim 1,
    wherein the beacon channel comprises a plurality of dedicated beacon channels, and
    wherein a first bandwidth of each of the plurality of dedicated beacon channels is in a range from two times a second bandwidth of each channel of the frequency hopping channels to three times the second bandwidth, inclusive.

8. A node configured to:
    receive, from a parent node, a beacon packet on a wideband, non-frequency hopping beacon channel; and
    communicate, with the parent node, on a plurality of narrowband, frequency hopping channels, after receiving a grant to join a network from the parent node.

9. The node of claim 8, wherein the beacon packet is received on a separate network from the network of the plurality of frequency hopping channels.

10. The node of claim 8, wherein transmit power of the beacon packet is greater than transmit power on the plurality of frequency hopping channels.

11. The node of claim 8, wherein the beacon packet comprises control information to control network operation.

12. The node of claim 8, wherein the beacon packet comprises frequency hopping protocol (FHP) information.

13. The node of claim 8,
    wherein the beacon channel comprises a plurality of dedicated beacon channels, and
    wherein a first bandwidth of each of the plurality of dedicated beacon channels is in a range from two times a second bandwidth of each channel of the frequency hopping channels to three times the second bandwidth, inclusive.

14. The node of claim 8, further comprising monitoring the beacon channel for at least a duration of the beacon channel.

15. The node of claim 8,
    wherein the beacon channel comprises a plurality of dedicated beacon channels including a first dedicated beacon channel and a second dedicated beacon channel, and
    wherein the node is configured to:
        determine that a first signal-to-noise ratio of the first dedicated beacon channel is less than a second signal-to-noise am of the second dedicated beacon channel;
        select the second dedicated beacon channel in response to determining that the first signal-to-noise ratio is less than the second signal-to-noise ratio; and
        receive the beacon packet on the second dedicated beacon channel after selecting the second dedicated beacon channel.

16. A method comprising:
    transmitting, by a network master of a network, a beacon packet on a wideband, non-frequency hopping beacon channel;
    adding a node to the network; and
    communicating, by the network master, with the node on a plurality of narrowband, frequency hopping channels, after adding the node to the network,
    wherein a first bandwidth of the beacon channel is at least two times a second bandwidth of each channel of the frequency hopping channels.

17. The method of claim 16, wherein the beacon channel has a greater transmit power than each of the plurality of frequency hopping channels.

18. The method of claim 16, wherein the beacon packet is transmitted on a separate network from the network of the plurality of frequency hopping channels.

19. The method of claim 16, wherein the beacon packet comprises control information to control network operation.

20. The method of claim 16,
wherein the beacon channel comprises a plurality of dedicated beacon channels, and
wherein a first bandwidth of each of the plurality of dedicated beacon channels is in a range from two times a second bandwidth of each channel of the frequency hopping channels to three times the second bandwidth, inclusive.

* * * * *